(12) United States Patent
Bensemana

(10) Patent No.: US 7,188,076 B2
(45) Date of Patent: Mar. 6, 2007

(54) SYSTEM AND METHOD FOR CREATING A TRUE CUSTOMER PROFILE

(75) Inventor: Laurent Bensemana, Hampstead (CA)

(73) Assignee: NDEX Systems Inc., Montreal (CA)

( * ) Notice: Subject to any disclaimer, the term of this patent is extended or adjusted under 35 U.S.C. 154(b) by 719 days.

(21) Appl. No.: 09/740,641

(22) Filed: Dec. 19, 2000

(65) Prior Publication Data
US 2001/0044739 A1 Nov. 22, 2001

Related U.S. Application Data

(60) Provisional application No. 60/172,595, filed on Dec. 20, 1999.

(51) Int. Cl.
G06F 17/30 (2006.01)
(52) U.S. Cl. .................................. 705/10
(58) Field of Classification Search .............. 705/10
See application file for complete search history.

(56) References Cited

U.S. PATENT DOCUMENTS

| | | | | |
|---|---|---|---|---|
| 4,908,761 | A | 3/1990 | Tai | 364/401 |
| 5,704,017 | A | 12/1997 | Heckerman et al. | 395/61 |
| 5,758,259 | A | 5/1998 | Lawler | 455/5.1 |
| 5,796,952 | A | 8/1998 | Davis et al. | 395/200.54 |
| 5,826,164 | A | 10/1998 | Weinblatt | 455/2 |
| 5,854,923 | A | 12/1998 | Dockter et al. | 395/605 |
| 5,915,243 | A | 6/1999 | Smolen | 705/14 |
| 5,918,014 | A | 6/1999 | Robinson | 395/200.49 |
| 5,918,217 | A | 6/1999 | Maggioncalda et al. | 705/36 |
| 5,920,848 | A | 7/1999 | Schutzer et al. | 705/42 |
| 5,945,988 | A | 8/1999 | Williams et al. | 345/327 |
| 5,973,683 | A | 10/1999 | Cragun et al. | 345/327 |
| 5,999,908 | A * | 12/1999 | Abelow | 705/1 |
| 6,236,978 | B1 * | 5/2001 | Tuzhilin | 705/26 |
| 6,298,348 | B1 * | 10/2001 | Eldering | 707/10 |
| 6,611,842 | B1 * | 8/2003 | Brown | 707/102 |

FOREIGN PATENT DOCUMENTS

WO WO 9740446 A1 * 10/1997

OTHER PUBLICATIONS

Attanasio "Consumption and saving behavior"; Feb. 1997, Fiscal Studies v18n1 pp. 23-47; Dialog file 15, Accession No. 01407400.*
David "Survey Data: Use of Scater Plots for Displaying Scale and Consistency Factors"; 1995; pp. 99-102.*

* cited by examiner

Primary Examiner—Romain Jeanty
(74) Attorney, Agent, or Firm—Darby & Darby

(57) ABSTRACT

The present invention concerns a system and method for initially determining a profile for a consumer, and thereafter validating or invalidating the initial profile, and continuously updating the same. As such, the consumption profile serving at any one time as the 'governing' consumer consumption profile, is considered to be the most up-to-date and representative consumption profile of that customer and thus the most representative of the "true" consumption profile of that customer at that point in time. Consequently, upon having validated the customer's consumption profile as the most up-to-date and representative consumption profile of that customer, this same profile is to be deemed as the "true" consumption profile of that customer, and is subsequently to be referenced as the consumer's current benchmark "true" consumption profile, up until the point a new governing profile is warranted and established. The differences between the initial profile and the actual behavior of the customer are identified in order to create a log of consistencies and inconsistencies, which serve to establish the new governing profile. The system serves to provide better products and services to a customer.

16 Claims, 9 Drawing Sheets

SUMMARIZED VIEW OF TOTAL FLOW LOGIC

ESTABLISHING AN INITIAL GOVERNING CONSUMPTION BEHAVIOUR PROFILE AS PER A CONSUMER'S
*SELF PERCEIVED*
CONSUMPTION BEHAVIOUR PROFILE

COMPARISON AND RECONCILIATION OF CONSUMER'S SELF-PERCEIVED CONSUMPTION PROFILE AND HIS ACTUAL CONSUMPTION DERIVED PROFILE

SYSTEM AND METHOD FOR CREATING A TRUE CUSTOMER PROFILE

This patent application claims the priority of U.S. provisional patent application No. 60/172,595, filed on Dec. 20, 1999, which is incorporated herein by reference.

FIELD OF THE INVENTION

The present invention relates generally to a system and method for creating a "true" customer consumption profile.

DESCRIPTION OF THE PRIOR ART

In the field of customer fidelity, a number of techniques have been proposed to target specific products and/or services to a customer. The vast majority of these techniques are based on one of two fundamental approaches: tracking, in one way or another the behavior of the person, or simply asking the person for preferences, and using that information to derive a profile.

Alternatively, some techniques have been proposed to attempt to predict which item within a list would best suit a customer's needs, based on prior historical data.

Although these techniques have met with relative success, they limit their focus on trying to predict which item is best for the customer, as based on data obtained by the tracking of the customer's past consumption habits or the stated consumption habits as outlined by the customer himself.

It is believed however that the value in the resulting predictions as derived via the above stated process would be greatly increased, if the search result would further look to determine a more basic question, such as "is the resulting selected item "truly" the one sought out/needed by the customer" —i.e. to not simply limit the inference to, "which option within a list is best?", but rather to identify, correlate and weight the similarities and differences existing between the stated perceived "wants" of the customer with the actual observed "needs" of that same customer, so as to determine, "which option within a list is best for that particular and unique customer?"

This difference in approach will become more apparent throughout the present description, and forms the basis of the present invention.

SUMMARY OF THE INVENTION

It is an object of the present invention to provide a system and method for initially determining a profile for a consumer, and thereafter validating or invalidating the initial profile, and continuously updating the same. As such, the consumption profile serving at any one time as the 'governing' consumer consumption profile, is considered to be the most up-to-date and representative consumption profile of that customer and thus the most representative of the "true" consumption profile of that customer at that point in time. Consequently, upon having validated the customer's consumption profile as the most up-to-date and representative consumption profile of that customer, this same profile is to be deemed as the "true" consumption profile of that customer, and is subsequently to be referenced as the consumer's current benchmark "true" consumption profile, up until the point a new governing profile is warranted and established.

In accordance with the invention, this object is achieved with a system for creating a consumer's "True" consumption profile, comprising of:

means for initially establishing a consumer's self-perceived consumption behaviour profile;

means for monitoring said consumer's behaviour to create an actual behaviour derived consumption profile;

means for comparing said consumer's self-perceived consumption behaviour profile with the consumer's actual behaviour derived consumption profile to identify consistencies and inconsistencies; and means for creating a consumer's "true" consumption behaviour profile based on the consumer's self-perceived consumption behaviour profile, the consumer's actual behaviour derived consumption profile.

In accordance with another aspect of the invention, this object is achieved with a method for creating a consumer's "true" consumption profile, comprising the steps of:

(a) entering an initial consumer's self-perceived consumption profile;

(b) tracking the actual consumption behaviour of a consumer;

(c) comparing the initial consumer's self-perceived consumption profile with the actual tracked consumer's consumption behaviour; and (d) creating a "true" consumer's consumption profile based on the comparison between the initial self-perceived consumer's consumption profile and the actual tracked consumption behaviour of the consumer.

This stated objective is to be achieved first and foremost by recognizing that inconsistencies often exist between the perceptual (psychological) "wants" and actual (physical) "needs" that influence a consumer's consumption decision and by establishing a correlative bridge between a consumer's self-perceived consumption profile (wants), and his actual consumption behaviour derived profile (a behaviour pattern most often indicative of a combination of both the customer's self-perceived "wants" and his actual "needs").

BRIEF DESCRIPTION OF THE DRAWINGS

The present invention and its advantages will be more easily understood after reading the following non-restrictive description of preferred embodiments thereof, made with reference to the following drawings in which.

DESCRIPTION OF A PREFERRED EMBODIMENT OF THE INVENTION

Figure 1:
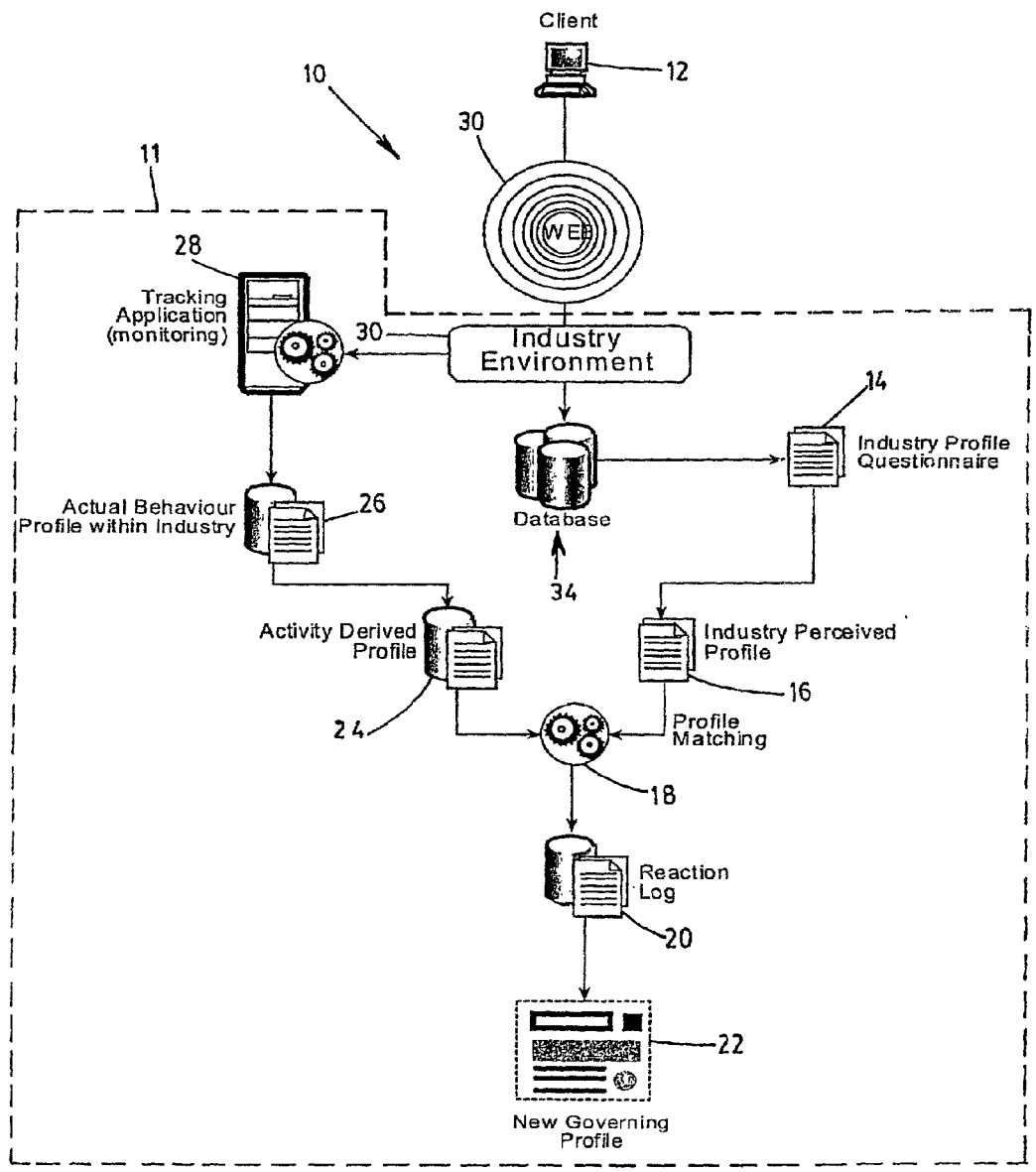
FIG. 1 is a schematic representation of a system according to a preferred embodiment of the present invention.

The present invention relates to a methodology and a system for establishing the "true" consumer behavior profile of an individual. The system is useful for vendors (the "users") who want to know their customers better, or individuals who want to know themselves better.

In essence, the process is based upon the comparison between the responses given to an industry specific customer profiling questionnaire and/or other industry specific customer profiling determination tools, with that of the actual consumption behaviour pattern results as obtained via the monitoring of the customer's behaviour during his active participation within that given industry, and with that of the customer's reaction when presented with consistencies and inconsistencies between the two above stated consumption profiles.

The two first sets of data are stored within a database where the customer's self-perceived consumer profile (his "wants") (as obtained via the industry specific questionnaire and/or other industry specific profile determination tools) and the customer's actual consumption behaviour profile (his "needs") (as outlined by monitoring the customer's actual consumption pattern within the same industry) are compared and correlated so as to identify the third set of data, the consistencies and inconsistencies identified between the two profiles, which are most often indicative of the absence of a reconciled representation of both the consumer's "wants" and "needs".

Consequently, a consumer's "true" consumption profile can be determined as a result of analysing each individual profile or more accurately attributing a weight coefficient to the reconciled results observed upon the comparison of the two profiles or upon the consumer's consumption behaviour reaction thereof to the reconciled results or a combination thereof.

The customer in question may at a point in turn, be encouraged to respond to a set of additional questions immediately prior to commencing a potential consumption-leading search (questions may also be posed immediately prior to concluding a transaction stemming from the undertaking of a consumption-leading search). The results to these questions may further serve to establish the customer's self-perceived "wants" immediately prior to undertaking a consumption-leading search or exercising a transaction stemming from the undertaking of a consumption-leading search. As such, further benefits for the purpose of establishing a customer's "true" consumption profile may be two-fold. Firstly, the customer's current governing consumption profile may either be further validated or may require an update. Secondly, it may be observed that the customer commences a consumption-leading search under one state-of-mind, which may or may not be consistent with his current benchmark profile, yet concludes under an altogether or partially different state-of-mind, which itself in-turn may or may not be consistent with the customer benchmark profile currently being measured-up to. As such, these findings may serve to further validate the currently referred-to governing consumption profile or serve to indicate the need for a consumption profile update. Under certain conditions the customer in question may adhere to an altogether different, yet consistently re-occurring consumption profile. All of the above can further serve to more properly and poignantly identify the consistencies and inconsistencies existing between a customer's self-perceived consumption behaviour pattern as compared to his actual consumption behaviour pattern, once again enabling a user to better understand his client.

The essence of the method and system of the present invention is to recognize a need for, and consequently establish a bridge between the psychological, perceptual and physical consistencies and inconsistencies existing between a consumer's self-perceived consumption profile, and a consumer's actual behaviour derived consumption profile (this applies equally to an individual as well a corporation). This system has for practical purposes, the accurate and well-founded elaboration of a customer's "true" consumption profile, arrived at by correlating the consistencies and inconsistencies between the perceived "wants" and actual "needs" of a consumer.

A reverse approach may also be used, in which the accurate and well-founded elaboration of a consumer's "true" behavioral profile will lead to the establishment of a customer's "true" consumption profile.

The design of the system employs the approach of continuously correlating and attributing a weighting (as per each vendor's industry specific behaviour analysis model) to the consistencies and inconsistencies existing between a customer's self-perceived profile (his "wants"), and that same customer's actual consumption behaviour derived profile (most often reflective of a combination of both the user's "wants" and "needs"). As such, this invention enables the vendor user to create a comprehensive bridge between the psychological and physical discrepancies existing between an individual's self-perceived consumption profile and his actual consumption behaviour derived profile, all of which ultimately leading to the establishment of the "true" consumption behavior profile of that individual consumer (i.e. a consumer consumption profile taking into account the distinction between the consumer's "wants" and "needs").

As a result of bridging a customer's self-derived consumption profile with that of his actual market consumption behaviour derived profile, an improved assessment of actions and strategies to be adopted in order to better meet and support the targeted customer's "true" consumption behaviour profile are enabled.

The system and method according to a preferred embodiment of the present invention first looks to the user to state his consumer profile, as he perceives it to be (i.e. the establishing of the consumer's "wants" as per the consumer's self perception). This is preferably done through the answer to a few key, yet poignant questions. These sets of questions will be determined in relation to the industry in which the consumer profile is to be established. More specifically, the questions will be tailored to a specific industry, such as the financial industry, the retail industry (which could even be broken down into: clothing; hardware; computers; etc.) and others.

However, in certain circumstances a consumer's "true" consumption profile as observed within a particular industry environment, may be entirely or partially relied upon in the determination of that same consumer's supposed (i.e. yet to be validated) "true" consumption profile within a second and altogether independent and unrelated industry environment. This assumption can enable rapid and effective cross-selling opportunities.

Further alternatively, the profile can be created using a consumer tracking model, or a historical knowledge base, or a combination thereof.

Upon having a tangible consumer profile benchmark established by the concerned consumer himself, the system then tracks or surveys the consumer's actual consumption behaviour pattern, continuously searching for, logging and comparing the consistencies and inconsistencies existing between the consumer's self perceived consumption profile with that of the same consumer's actual consumption behaviour derived profile.

Furthermore, by permitting the consumer to re-state his self-perceived consumption behaviour profile immediately prior to him undertaking a consumption-leading search, further consumption profile comparisons may be done with regards to the consistencies and inconsistencies existing within that consumer's frame-of-mind, even at the point closest to actual consumption experience. Consequently, the comparison and reconciliation of the above illustrated consumption profiles, followed by the representation of these observations to the said consumer himself may further lead to the consumer's "True" consumption profile being determined as a result of analysing each individual consumption profile, attributing a weight coefficient to the reconciled results observed upon the comparison of each consumption profile, or upon the consumer's consumption behaviour reaction thereof to the reconciled results (or a combination thereof).

As such, the longer and more extensive the use of the system, the more accurate the determination of the user's "true" consumption profile, therefore avoiding sales and service errors induced by relying solely on the often misleading self-perceived "wants" of the customer.

The results of the ongoing evaluation and re-evaluation of a user's profile is then put forth as a set of governing profile parameters serving to better orient the user, as well as the vendor, as per the user's actual "needs" and "wants", and net his self-perceived "needs" and "wants" (i.e. as per the user's "true" consumption profile).

As such, a mutual sense of awareness, trust and loyalty results between the user (vendor) and his client due to the tangible and quantifiable knowledge that the supplier holds with regards to his client.

Within an economic environment, this system best enables vendors to avoid the inherent pitfalls present when servicing a client as based primarily on the client's self-stated/self-perceived "wants", and not on a proper weighting of the client's "true" and validated "needs" and "wants". It is key to remember that in a client's mind, more often than not, it is the vendor's fault for not having been able to properly grasp the subtleties between what the client expressed he "wanted" as compared to what the client really "needed".

The continuous monitoring, validating and updating of a consumer's benchmark consumption profile may be done with the use and combination of several potential frameworks, which should all be based upon the notion that "actions speak louder than words, yet the spoken word may indicate the original intention as it was perceived".

The following are but a few illustrations of these recommended frameworks. The first framework (it is highly recommended that this framework should always be applied) is on a conscious level and relies heavily on the consumer to be an active participant in the profiling/re-profiling process. The intentional and studied design of accessible and easy to use user interfaces (specific to the commercial environment at hand) encourages the consumer to efficiently and effortlessly contribute information indicative of his self-perceived consumption behaviour parameters when making a purchase or immediately prior to the undertaking of a consumption leading search or during the actual undertaking of a consumption leading search. This collected data is logged and is compared to the currently referenced go-forward benchmark profile. Consequently, any and all consistencies and inconsistencies existing between the user's actual consumption behaviour profile (as per various consumer specific state-of-minds and the various stated consumption experience time-frames) and that of his self-perceived consumption behaviour profile can be registered and can potentially lead to the consumer's referenced benchmark "true" consumption profile to be updated.

The second proposed framework consists of simply monitoring the consumer's actual consumption behaviour pattern (conscious pattern), and thus continuously building, reviewing and updating the intended consumer's currently referenced benchmark consumption profile accordingly.

The third framework attempts to monitor the consumer on a subconscious level. Where as within calculated time and situational intervals, the consumer's areas of interest believed to be most current and representative of the consumer's vendor-derived consumption profile are pushed to the consumer so as to either validate them or require a review and modification of the consumer's consumption behavior/profile.

Optimally, the combining of the results of these frameworks serves to best identify and establish a customer's re-occurring behavioural and consumption parameters as based on a correlation and weighting of that customer's "true" "needs" and "wants", and not solely as per that customer's self-perceived "wants". As such, a reliable and well-founded consumer's "true" consumption behavior profile can be determined, validated and supported (for example: at a car dealership, a potential customer looks at a sports-coupe, however the pre-expected demographic and consumption parameters of the potential customer points toward a mini-van).

The added value that such a system design brings about is four-fold. Firstly a sense of fidelity can be established between the consumer and the vendor due to the vendor holding a detailed and perceptive database establishing a weighting to attribute to each of or part of a consumer's "true" "needs" and "wants". Consequently, the consumer may not as easily be willing to leave an environment that is so well in-tune with his "true" "needs" and "wants". Secondly, the consumer's sense of loyalty to a single supplier is greatly enhanced due to the consumer's sense of having invested time, money and effort in the pursuit of having a "true" consumption profile built for his own consumption experience satisfaction. Thirdly, the design of the system and its intrinsic profiling principle provides for cross-selling capabilities. Vendors will most certainly be capable of better orienting the cross-selling of other of their products and services to their existing customer base. Customers may be better supported and better made aware of other products and services available to them within the same vendor environment. Fourthly, the system and method on which it relies provides for increased individual account profitability. By more accurately targeting a customer's "true" "needs" and "wants", a vendor can better orient and structure his product and/or service offerings. A sales approach incorporating customer psychology can make all of the difference in closing a deal. Furthermore, by tracking the evolution of an account's "true" "needs" and "wants" parameters, a vendor may better anticipate what products and services his clients may require in the future, and thus make the appropriate decisions to remain in the forefront of his client's products and services supplier arena.

In a preferred embodiment of the invention, the customer in question is preferably made aware of all the resulting consistencies and inconsistencies with regards to the comparison of the customer's self-perceived consumption behaviour profile as compared to his actual behaviour derived consumption profile. As such, a further sense of client/vendor loyalty will reign due to the bilateral understanding that both parties are invested in working towards the establishment of a better founded and more mutually beneficial relationship.

Furthermore, as a vendor, it may be advantageous to implicate the customer in the weighting models attributed to the customer's stated perceived "wants" and his actual observed "needs". This may induce the customer to be more reflective and thus possibly more self-conscious as per his greater adherence to his "true" consumption behavior profile. It may also have the added benefit of pre-informing the customer that any straying from his most current "true"

consumption behavior profile may result in a proportionally or disproportionally dissatisfying consumption experience.

The most compelling reason for the customer in question to be made aware of all the resulting consistencies and inconsistencies with regards to the comparison of the said customer's self-perceived consumption behaviour profile as compared to his actual behaviour derived consumption profile is the ability for the vendor to further monitor and log his customer's reaction to the data represented as a result of this system. As such, the vendor may go as in-depth within his analysis and determination of a customer's "true" consumption behaviour pattern, as being able to impartially monitor the said customer's reaction when faced with the existence of inconsistencies between his self-determined behaviour profile and his actual consumption derived behaviour profile. Example: "What will the said customer do?" and, "What can it tell the vendor about his customer's consumption psyche?"

The system and method of the present invention will now be described in reference to the following drawings.

FIG. 1 shows the main components of the system, which are more fully illustrated in FIGS. 2 to 8.

The system, according to a preferred embodiment of the invention, consists of a client application 12 which is connected through a network 32 such as the internet to a central system 11. The central system, which is configured for specific industry environment 30, includes a tracking application 28, a database 34 and a profile matching unit 18. As mentioned previously, the client first establishes a base profile preferably through a questionnaire tailored to the specific industry 14. This questionnaire is used to make profile 16. Once this profile has been established, throughout the various interactions of the client 12 with the system 11, the tracking application 28 continuously, sporadically or intermittently monitors the client's activity. This activity is used to build an actual behavior profile within the specific industry at 26 and thus make an activity derived profile 24. The perceived profile 16 and the activity derived profile 24 are compared at 18 to identify any consistencies and inconsistencies between the industry perceived profile 16 and the activity derived profile 24. These consistencies and inconsistencies are preferably set out in a log which is presented to the client. The client upon the review of this log, identifies his or her reactions in respect of the various points outlined in the log. A reaction log 20 is thus obtained and a new governing profile 22 is established based on the industry perceive profile, the activity derived profile and the reaction log depending on a variety of weighting strategies.

Figure 2:
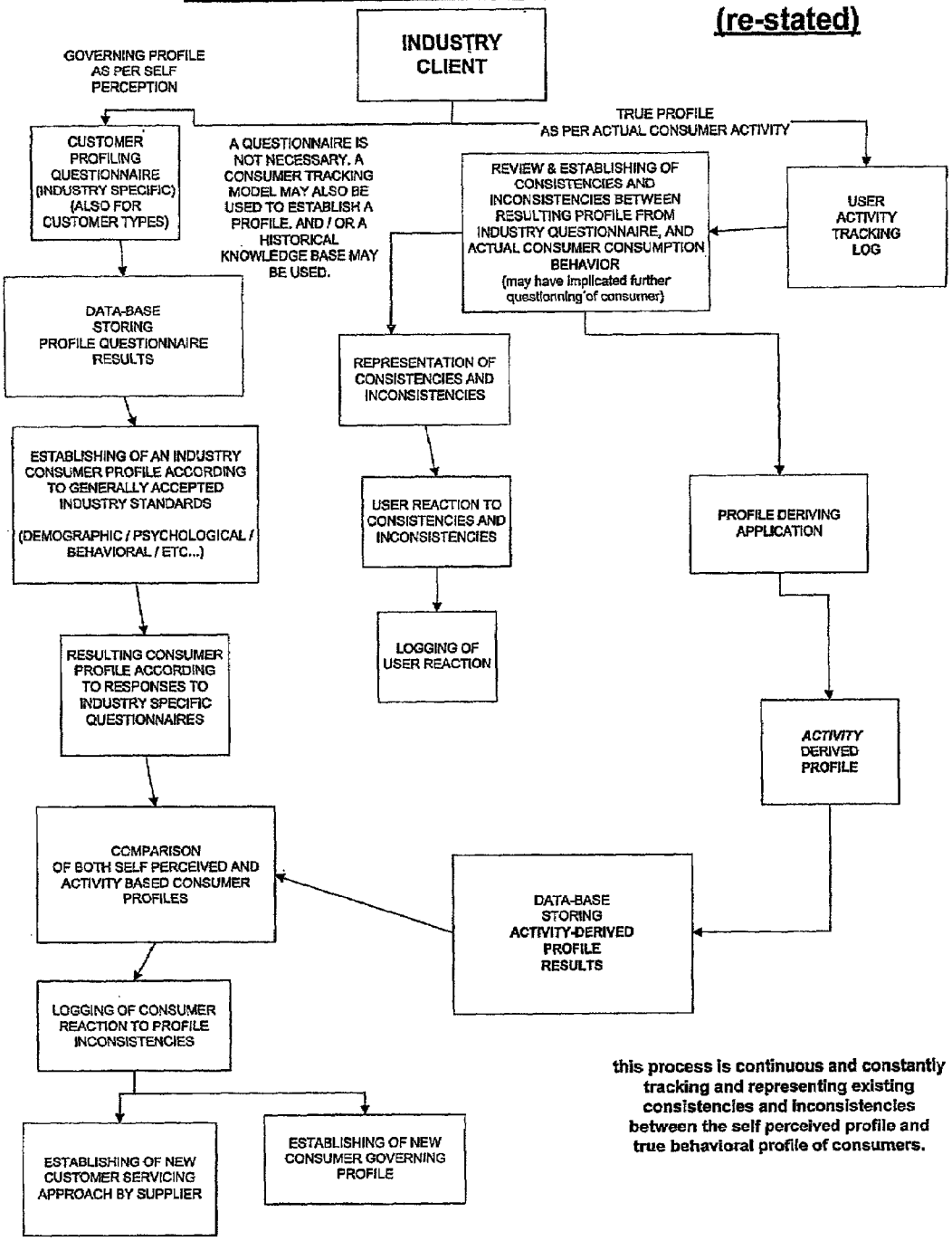
FIGS. 2 to 9 (encompassing steps 1 to 8) are block diagram representations of the method according to a preferred embodiment of the present invention.

Now referring to FIG. 2, the process of the present invention begins with an industry client 101. An initial governing consumption behavior profile is first established at 107. As mentioned previously, this can involve the use of an industry specific questionnaire, a consumer tracking model or a historical knowledge base.

Figure 3:
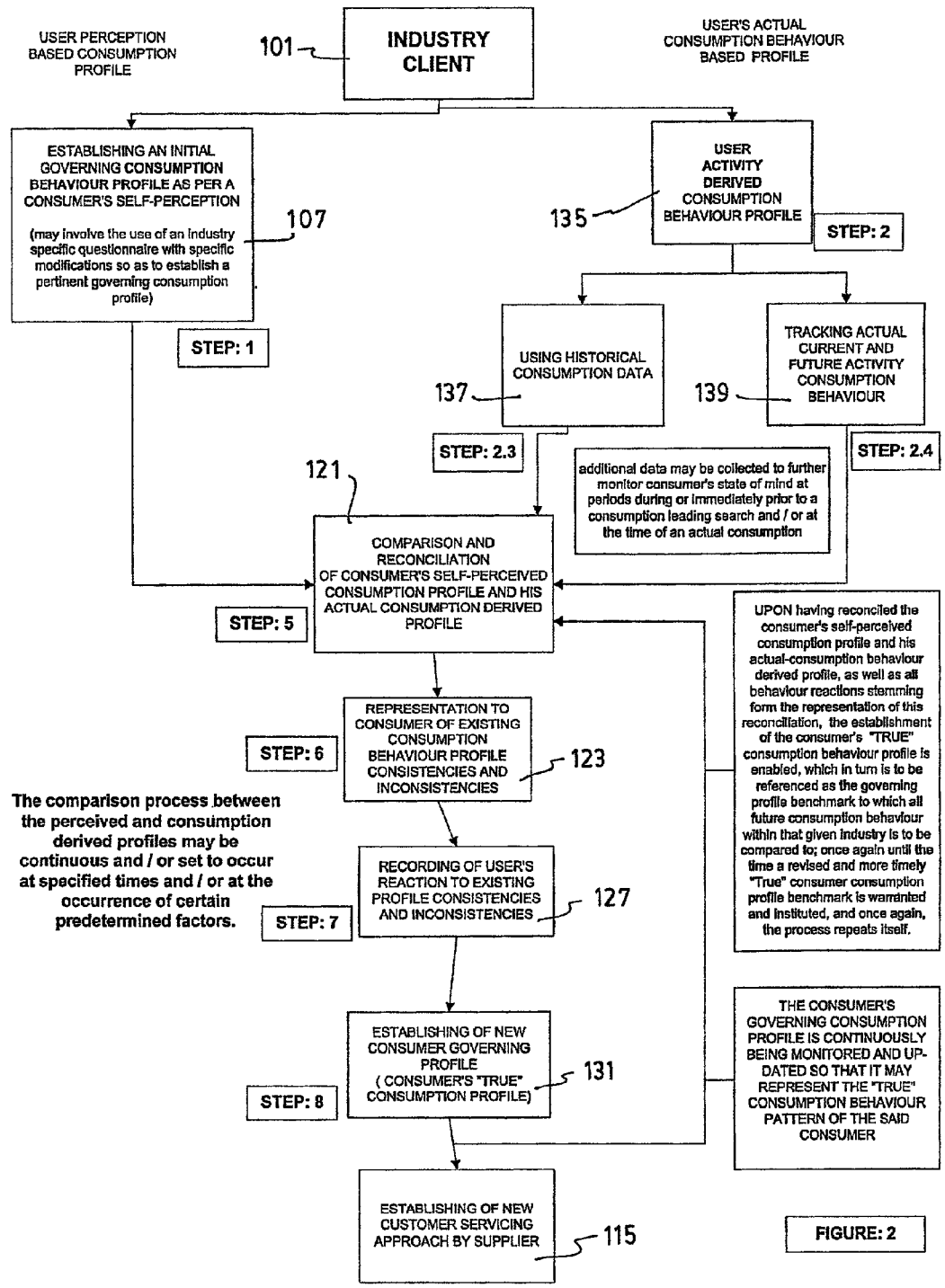

Referring now to FIG. 3, the initial governing consumption behavior profile steps are more detailed. In the case where an industry specific questionnaire is used, these results are stored within a database at 105 and an industry specific consumer profile is established at 109. The result is a consumer profile according to the responses given to the questionnaire.

The resulting responses are to be considered as the user's self-perceived consumption behavioural pattern, and as such the accuracy and "true"representation of the profile are yet to be confirmed and validated. Alternatively, if a historical consumption record for the consumer is available, and the organization seeking the information is comfortable with its relevance and accuracy, this data may also be employed to establish a go-forward consumer consumption profile as derived by the historical consumption record of the customer. It is important to note that as of yet, the identification of a consumer's "True" consumption profile can not yet be claimed.

The logging and storing of questionnaire responses is then performed. All responses to the questionnaire are logged and stored within a profile data database under the "self-perceived profile" category. As such, this data may be retrieved at any time for comparative purposes, validation purposes and decision-support purposes. More specifically, the "comparative purposes" serve to evaluate "if what was said is being done" as compared to "what is actually being done"; the "validation purposes" serve to evaluate whether or not "if what was said is actually being done", and the "decision-taking purposes" serve to evaluate "what to do now?" or "when to do it?"

This data, regardless of its age and current relevance, is continuously stored and updated. It is important for the system that no data is ever destroyed or considered as being no longer relevant.

This system has for an objective to build a "movie-like" illustration, and not a "snap-shot", of a consumer's "True" consumption profile as it stood and currently stands throughout his consumption-life.

Consequently, the evolution of the consumers' consumption behaviour pattern profile may be established and further used so as to demonstrate the various stages of consumption pattern that a particular consumer went through in regards to a particular industry over a specified period of time. Past profile parameters may be referred to as possible supports to present and future decisions and serve as reference if legal considerations were ever to come forward in the accusation of wrongful advice and/or client dissatisfaction via the supplier.

The data collected within the questionnaire is subjected to generally accepted industry standard consumption profiling measurement principles, such as; demographic profiling measurements, psychological profiling measurements, and behavioural profiling measurements. The use of any or all of the above is left to the discretion of the industry and/or organization seeking the information. The measure of evaluating and attributing value and weight to any or all of the responses, consistencies, inconsistencies and behaviour patterns that may result is to be left to the discretion of the industry or organization at hand. Most organizations will have certain pre-established principles of measurement as to qualifying the type of consumer they are dealing with.

Referring back now to FIG. 2, once this initial governing consumption behavior profile is established, the user's actual consumption behavior is monitored. It should be understood that this monitoring of the behavior can take many different forms. For example, and not limited thereto, the monitoring can be done through keeping a log of various web sites that are visited, actual purchases made (and returns, if the case be), simulations performed, etc. It can also include responses to surveys, biomedical responses to hearing a sound, song, clip, etc., or to viewing a video of any kind (through appropriate sensors). The important aspect of the invention is that the behavior is tracked in one way or another, and this tracked behavior is logged.

At step 2, block 135, a user activity derived consumption behavior profile is established using historical consumption data 137 or the actual current and future activity consumption behavior of the client 139. A comparison and reconciliation of the consumer's self-perceived consumption profile and the actual consumption derived profile step 5 is performed at 121. The consistencies and inconsistencies identified at 121 are represented to the client at 123 and the user's reaction to these consistencies and inconsistencies are recorded at 127. Based on the user's reactions and an appropriate weighting strategy, a new consumer governing profile is established at 131 which leads to the established new customer service approach by the supplier 115.

Upon having reconciled the consumer's self-perceived consumption profile and the actual consumption behavior or drive profile, as well as all behavior reactions stemming from the representation of this reconciliation, the establishment of the consumer's true consumption behavior profile is enabled. This is in turn referenced as the governing profile benchmark to which our future consumption behavior within that given industry is to be compared to. This, of course, is until the time a revised and more timely consumption profile benchmark is warranted and instituted. The process, of course, is continuously updated. The user's actual activity based behaviour can be distilled as of several processes, such as; information requests, consumption habits, purchasing habits, field of operations, web-surfing habits, etc. (as per step 4), and/or using existing historical consumption behaviour data (as per step 3). It should be understood that the present invention's use of consumption data is not limited to any particular field of consumption behaviour activity, and/or currency of data (any starting point is considered as such, and is deemed a poop starting point). All of the respondent's actual activities are logged and stored within a profile data database under the "actual behaviour profile" category, where it will in turn (as of step 5) be continuously compared and correlated to the consumer's "self-perceived consumption profile".

Figure 4:
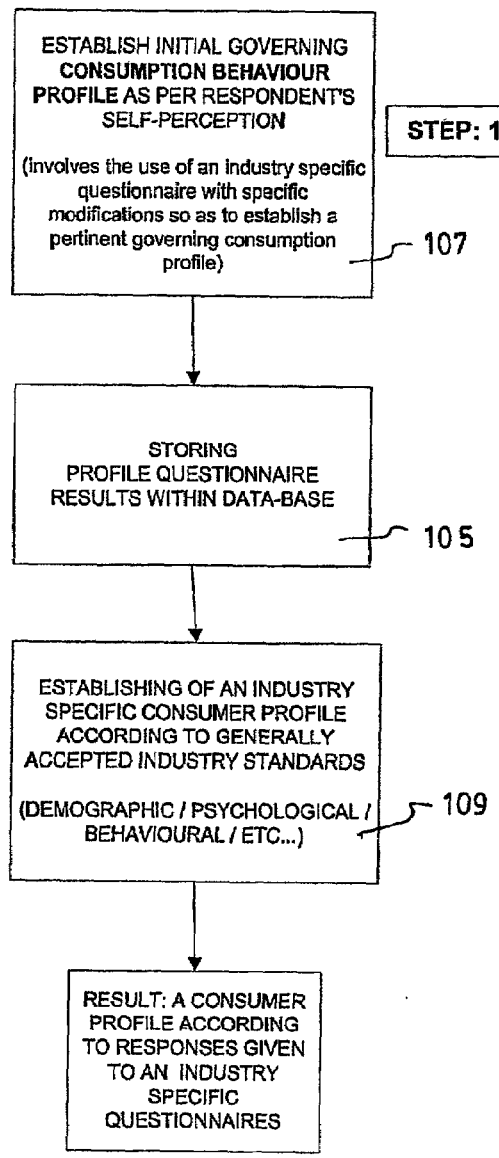
Figure 5:
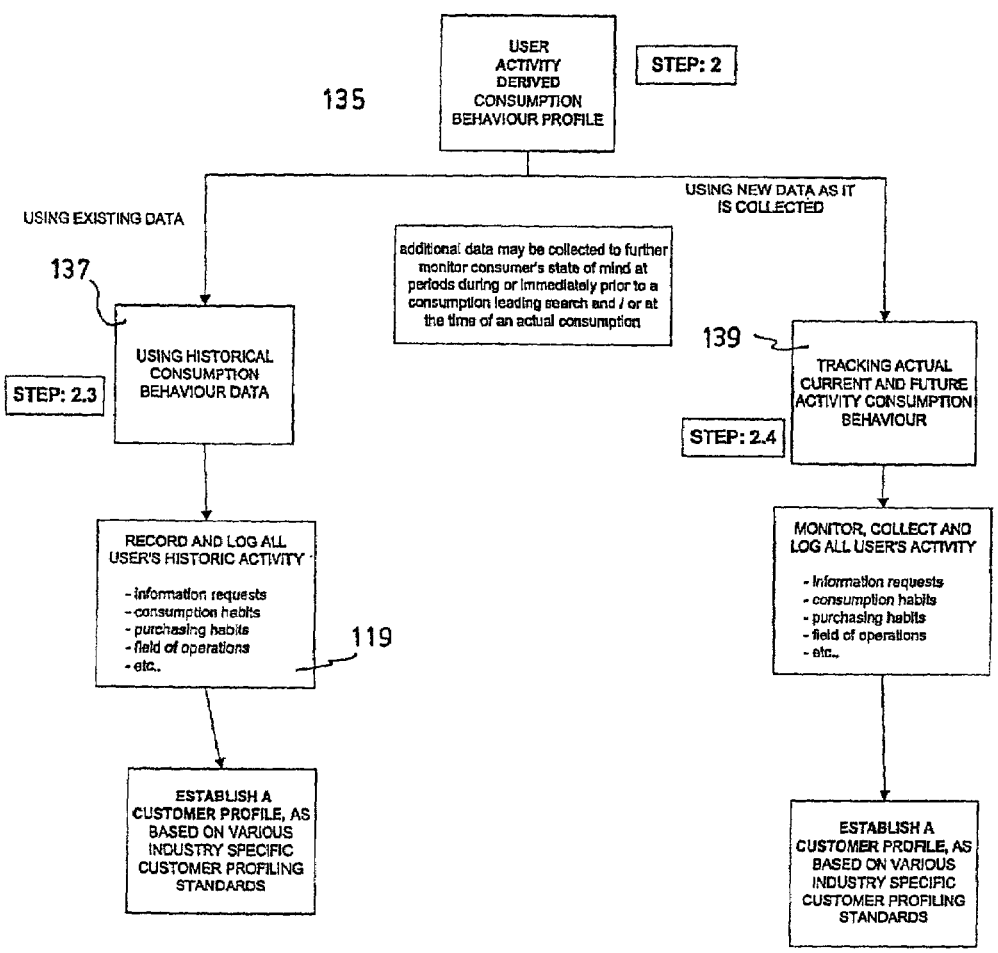

As illustrated at FIG. 4, the monitoring collection and logging of all users' activity can include things such as information request, consumption habits, purchasing habits, field of operations, etc. It should also be understood, and as mentioned previously, that additional data may be collected to further monitor the consumer's state of mind that period during or immediately prior to consumption leading search or at the time of an actual consumption such as a sale or a purchase executed over the internet.

The consumer's actual consumption behaviour data, as well as his self-perceived consumption behaviour data, as well as all existing consistencies and inconsistencies derived as a result of their reconciliation, may be retrieved at any time in the future for comparative purposes, validation purposes, decision-taking purposes, and the ability to identify and illustrate an evolutionary consumption behaviour path for that said consumer.

As mentioned previously, a majority of industries have established demographic and profiling tools. As such, the logged behaviour pattern of the user can be compared to the profiling tools as made acceptable and available by the industry (as per step 5). It should be understood that this tool does not attempt to establish new profiling standards for each industry it is applied to, but rather relies on the experiences and customer behaviour knowledge already collected and proven to be representative of the consumption habits of the customer's of the industry at hand. If any modification to the profiling standards of an industry results by the use of this tool, it is simply as an added benefit to its' vendor users and not this tool's intended purpose.

In step 5, the comparison between the self-perceived consumption profile and the actual consumption profile is performed. This step is constantly in application so as to continuously reconcile the currently referred to governing benchmark consumption profile with the actual consumption profile. Essentially, the basic question that is being asked is: "Is the respondent behaving as his responses to the self-derived profile and/or referred governing benchmark consumption profile would indicate?

The benefactor of the data representing existing consistencies and inconsistencies between the self-perceived consumption profile and the actual-behaviour derived profile may select to present the consistencies and inconsistencies at various time intervals, at set time intervals, or only upon a request from the user.

Figure 6:
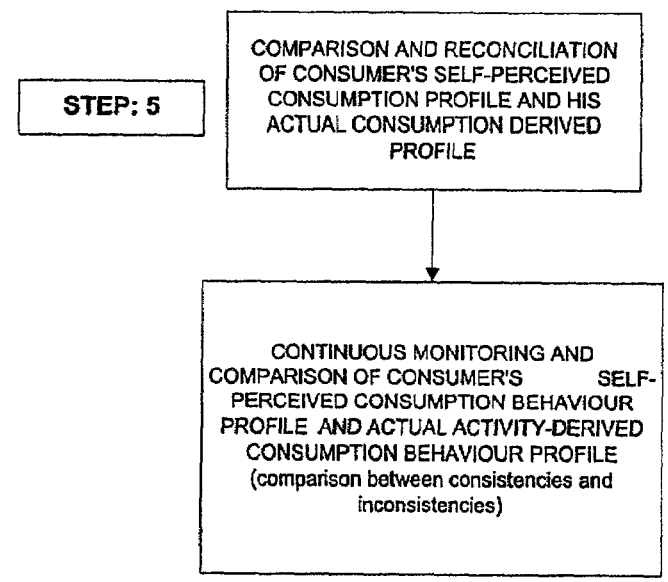

Furthermore, the representation to the consumer of the existing consumption behavior profile consistencies and inconsistencies step 6 is illustrated at FIG. 6. These can be logged and reported continuously 141 at predetermined times 143 or on request 145. In all cases, the user profile derived as based on actual consumption activity is presented to the user 147 and the profile derived is based on the profile resulting from user's self-perceived consumption profile is also presented at 149. The user is permitted to self-identify the profile consistencies and inconsistencies. In parallel, the consistencies and inconsistencies are established and demonstrated 153.

In step 6, the existing consistencies and inconsistencies as well as any reoccurring behaviour patterns are represented to the respondent. Doing it so may elicit a consumer consumption behaviour reaction and thus potentially further support the identification and establishment of the consumer's "true" consumption behaviour profile (as per step 7). It is recommended that no opportunity to bring forth and/or to question the respondent's behavioural consistencies and inconsistencies should be lost. The more the active questioning of a respondent as regards to the consistencies and inconsistencies existing between his self-perceived and his actual behaviour derived consumption profile, the greater the enhanced repercussive benefits of this tool for both the respondent as well as the vendor user. In fact, a better-informed consumer and vendor make for a better business relationship.

This enables a respondent as well as the industry user to view the existing consistencies and inconsistencies and consequently identify potential adjustments to the governing profile. These changes may be done employing the industry's standard consumption profiling tools. Other principles may be employed, all depending on what is most acceptable to the respondent and/or industry participant.

The self-identification and self-modification of the governing profile, to better represent the "True" behaviour of the respondent, will most certainly encourage a better self-awareness of the existing consistencies and inconsistencies and consequently induce a greater willingness to act more consistently in the future.

This representation clearly demonstrates the consistencies and inconsistencies existing between the self-perceived consumption profile and the actual behaviour driven profile and furthermore illustrates changes in the governing profile that would make a better representation of the "True" behaviour pattern of the respondent, and thus a more accurate benchmark as to which to track, compare and use to govern the consumption behaviour of the user. The identification and representation of possible adjustments to the governing profile may be supportive to those individuals having difficulty adjusting the parameters of the profile that they have long considered the correct representation of the consumption behaviour habits. As such, the tool may bring forward factual occurrences that would otherwise not be evident, or acceptable to those parties reviewing the results for the first time. People are often reluctant to see themselves, under a different light, even if that light is more accurately representative of their person.

In a preferred embodiment of the invention, a relative weight coefficient (as per industry specific standards) to some or all of the consistencies and inconsistencies existing in a consumer's self-perceived consumption profile compared to the consumer's derived profile is attributed. This weighting can be done through industry specific standards, consumer behavior specific standard, consumer consumption behavior psychology, or simple observation, all of which are well known in the art.

Figure 7:
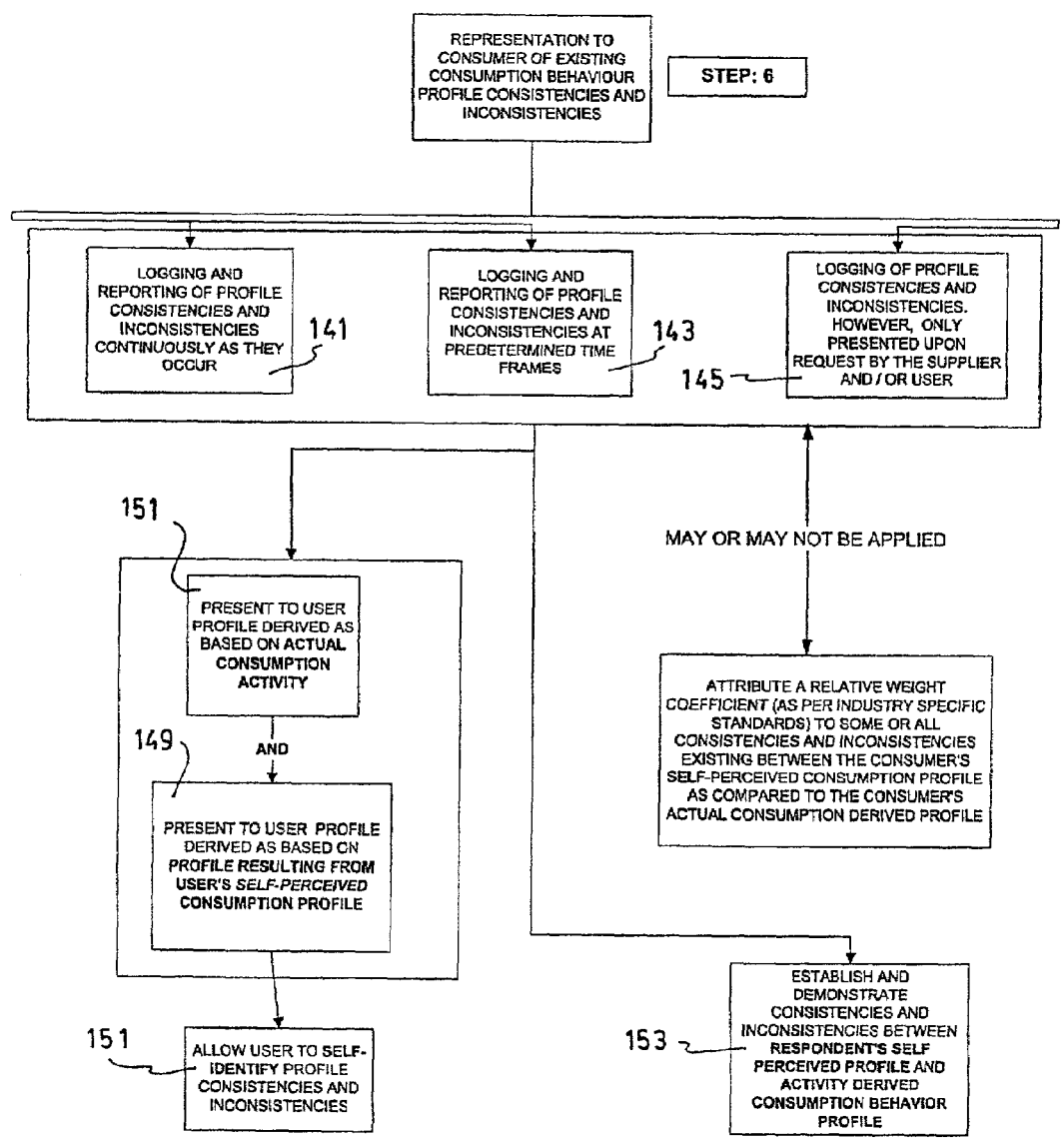

At step 7, referring now to FIG. 7, the user's reactions to the consistencies and inconsistencies are recorded. The respondent's reaction to the consistencies and inconsistencies may further serve to attribute a weight coefficient to each consistencies and inconsistency, and thus be better able to judge what consistencies and inconsistencies should be ignored and which should be taken into account when orienting or developing a product or service offering for a customer.

These records can serve to either 1) modify the activity derived profile, and/or 2) to serve the respondent in his efforts to adjust his behaviour so as to more closely adhere to the parameters established by the original self-perceived governing profile, and/or 3) render the respondent's actual consumption profile as the new and most up-to-date consumer governing profile, which will in turn be continuously monitored as it too once again be subject to the scrutiny of the ever changing "True" (see step 8) consumption profile of the said consumer, and/or 4) confirm and log that the respondent chooses to operate in an environment that is inconsistent with his person, and thus assumes all entailed risks thus relieving the vendor-supplier of any claims of a non-satisfactory consumption experience.

There are a variety of options which may impact on the governing profile and the user behavior. At 155, the user modifies the behavior to match the activity based consumption profile and/or the user modifies the self-perceived profile to match the activity based consumption profile 157. In both cases, the users looks to establish consistency between perception and reality 163 and thus the governing profiles modified to more closely represent the activity behavior profile 165. Alternatively, the user modifies the behavior to match the governing profile 167 which returns to 163 and the governing profiles thus modified 165. On the other hand, the user does not modify the self-perceived behavior profile 159 and/or does not modify the behavior activity to match the consumption profile 161. Consequently, the user does not look to establish consistency between perception and the governing profile is thus not modified.

Figure 8:
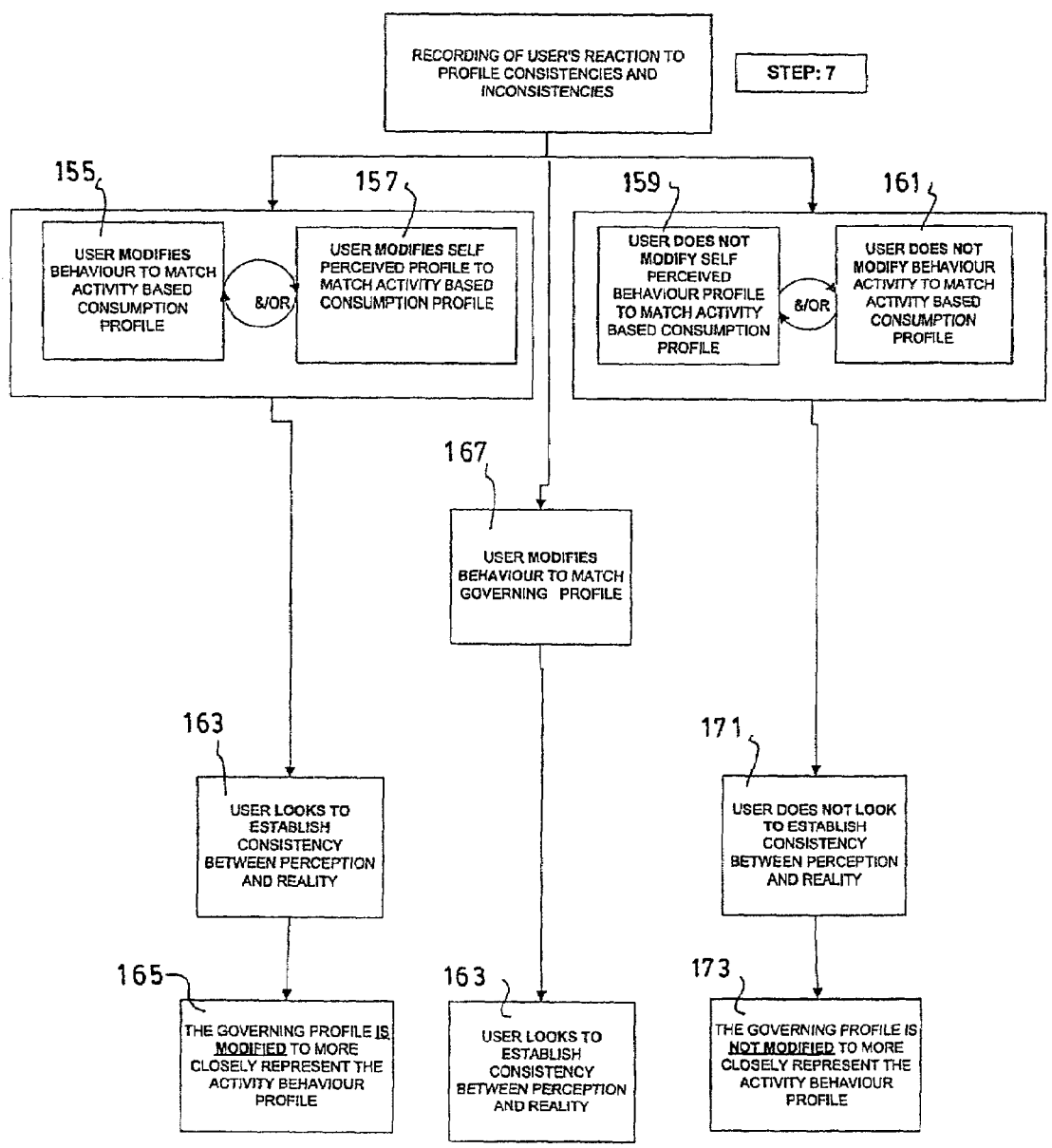

Referring out to FIG. 8, the new consumer governing profile will be established when the governing profile is modified to more closely represent the actual activity behavior profile 165 or the actual activity behavior is modified to more closely represent the governing profile 166.

In both cases, an industry recognized behavior profile representing the user's true behavior activity replaces the current governing profile. In other words, upon having reconciled the consumer's self-perceived consumption profile and his actual consumption behavior derived profile, as well as all behavior reactions stemming from the representation of this reconciliation, the establishment of the consumer's true consumption behavior profile is enabled. This in turn is to be referenced as the governing profile benchmark to which all future consumption behavior within that given industry is to be compared to.

Figure 9:
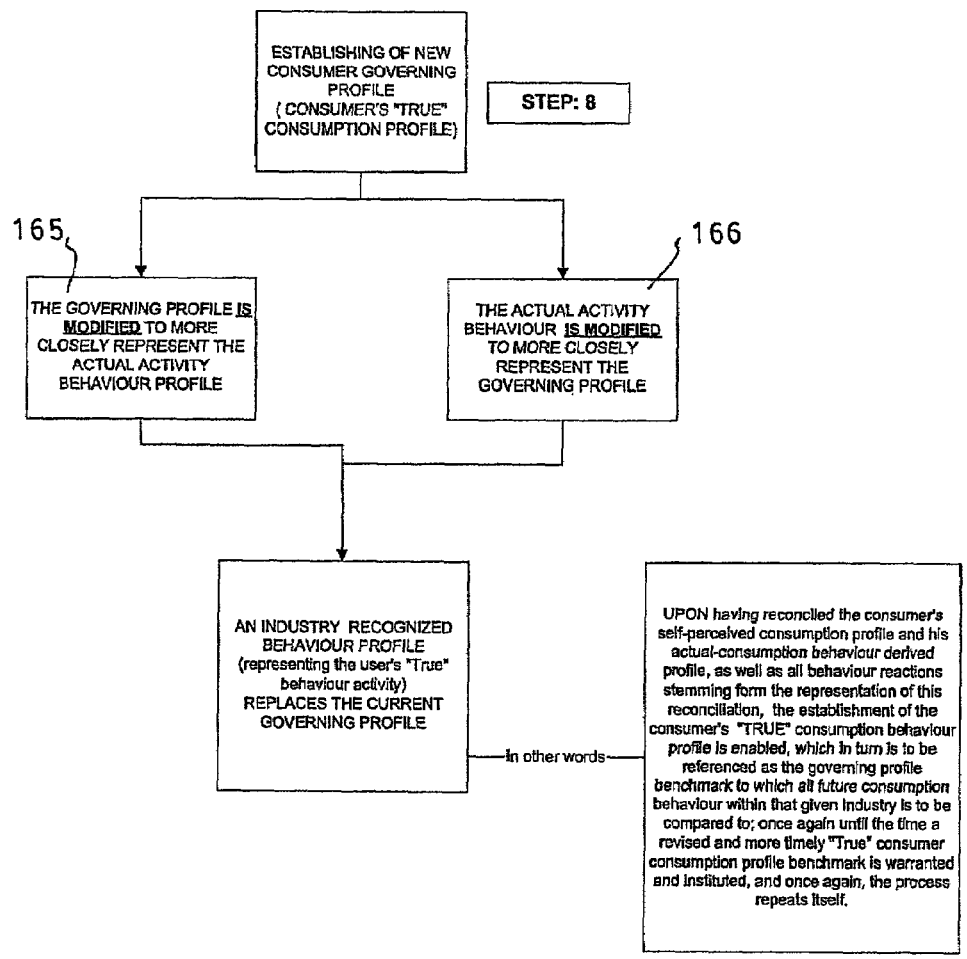

Referring to FIG. 9, a consumer's "true" consumption profile is established by means of identifying, correlating and attributing a weight coefficient to the consistencies and inconsistencies existing between a consumer's self-perceived consumption profile and his actual-consumption behaviour derived profile. As a result, in the future, a consumer may adjust his actual behaviour pattern to more closely represent his "True" consumption profile, or he may altogether continue to behave in an inconsistent manner with his "True" consumption profile, thus leading to the determination and validation of "True" consumption profile more representative and consistent with his actual behaviour pattern.

At this point, the reconciled consumer's self-perceived consumption profile and his actual-consumption behaviour derived profile, as well as all behaviour reactions stemming form the representation of this reconciliation leads to the establishment of a consumer's "TRUE" consumption behaviour profile, replacing the original go-forward consumer 'self-perceived' consumption profile as obtained via the consumer's responses to the industry questionnaire, historical data, industry specific profiling tools, etc. In turn, this newly established "TRUE" consumer consumption behaviour profile is referenced as the governing profile benchmark to which all future consumption behaviour within that given industry is to be compared to, once again up until the time a revised and more timely "TRUE" consumer consumption profile benchmark is warranted and instituted. And once again, the process repeats itself.

The establishment of a true profile permits a vendor or user to establish a better servicing approach to the customer.

An Example of the System Applied Within the Financial Brokerage Industry

The base parameters (i.e. questions) may be as follows:

At the point of opening an investor account, the investor should be required to complete an investor profile questionnaire as per industry standards.

This questionnaire may or may not include demographic and/or financial planning data.

The responses to this questionnaire will serve to establish the investor's profile as per the investor's self-perception.

It is recommended that this questionnaire contain at the very least the following two questions:

1. AS WITH REGARDS TO YOUR TOTAL PORTFOLIO, WHAT IS THE MINIMUM ROI (RETURN ON INVESTMENT) YOU REQUIRE/EXPECT?
2. AS WITH REGARDS TO YOUR TOTAL PORTFOLIO, WHAT IS THE MAXIMUM RISK (loss of capital) THAT YOU ARE WILLING/CAPABLE OF TOLERATING?

Consequently, upon having established the said investor's profile, as per responses given to questions such as; the investor's MINIMUM ROI and MAXIMUM RISK TOLERANCE PARAMETERS, a most current and representative investor profile (as per the investor's self-perception) for that said investor can be referenced as the initial benchmark investor profile, up until the point a new benchmark profile is warranted, supported and instituted.

The continuous tracking and comparison to all investment sought out opportunities, portfolio performances and/or investment performances as compared to the stated MINIMUM ROI and MAXIMUM RISK TOLERANCE PARAMETERS will serve to create a "TRUE" investor behaviour profile.—An investor's profile that takes into account an investor's self-perceived investment interests, his actual-investment behaviour derived interests, as well as his reaction to the consistencies and inconsistencies existing between these two profiles.

The greater the adherence to the MINIMUM ROI and MAXIMUM RISK TOLERANCE PARAMETERS with regards to investment searches and portfolio performance, the greater the accuracy of the initial responses given to the two stated questions in point A. As such, point A may be deemed as the most current and "True" investor profile.

If however, the practical searches of investment opportunities and the behavioural pattern in response to the actual performance of a portfolio and/or investment positions are inconsistent with the stated responses in point A, the validation for establishing a more representative and ultimately more "TRUE." investor profile may be present.

As a more pertinent and accurate set of investor profile parameters are established and validated, as based on the investor's actual investment-behaviour pattern, these new parameters will be introduced as the new most current points of referral to all investment sought out opportunities, portfolio performances and/or investment performances. As such, the system continuously readjusts its investor profile governing parameters so as to be representative of the most timely, pertinent and accurate profile of that said investor.

In short, the use of the proposed system enables the establishment and continuous comparison of an investor's self-derived investor profile, with his actual investment-behaviour derived investor profile as well as his reaction to an industry accepted weighting attributed to the consistencies and inconsistencies existing between the two. Consequently, a clear and accurate picture of an investor's governing profile parameters (a "True" investor profile) can be implemented within the system, and used to govern all of its monitoring, compliance, tracking, evaluating, warning (alarms) and searching functions.

It may also be that the investor is encouraged to respond to a few questions immediately prior to undertaking an investment leading search, and/or executing an actual investment decision.

An example of questions specific to a particular investment may be:

3. For how long do you plan on holding this position? (i.e. what is your investment time frame?)
4. Who or what is your preferred source of reference?
5. What are your objectives with regards to this particular investment/potential investment opportunity?

As such, these findings may further serve to i) establish the customer's self-perceived expectations (i.e. "wants") immediately prior to undertaking an investment-leading search and/or exercising a transaction stemming from the undertaking of a investment-leading search, ii) serve to further validate the currently referred to governing investor profile or iii) serve to indicate the need for a investor profile update. (it is not inconceivable that under certain conditions the investor in question adheres to an all together different, yet consistently re-occurring investor profile).

As an illustration, the responses to various questions may be as follows:

Point: A
Responses to Questionnaire

| | |
|---|---|
| 1. What is the Minimum ROI you require/expect? | 10% |
| 2. What is the Maximum RISK you can tolerate? | 5% |
| 3. What is the time horizon of an investment/portfolio? | 5 years |
| 4. Who is your preferred reference? | Analysts |
| 5. What are your investment objectives for a portfolio/investment? | Retirement |
| The responses would indicate a <<conservative>> investment stance. | |

Point: B
Actual Behaviour Pattern

| | |
|---|---|
| 1. What is the Minimum ROI that is actively participated in? | 17% |
| 2. What is the Maximum RISK that is actual tolerated? | 9% |
| 3. What is the time horizon of an investment/portfolio that is actually maintained? | 6 months |
| 4. Who is the actual preferred reference? | My brother |
| 5. What are the actual investment objectives for a portfolio/investment as determined by the investor's behaviour? | Growth |
| The actual investor behaviour would indicate a <<growth>> investment stance | |

Point: C
RESULTING "TRUE" INVESTOR PROFILE

| | |
|---|---|
| 1. What is the Minimum ROI that is ACTUALLY SOUGHT OUT? | 17% |
| 2. What is the Maximum RISK that is ACTUALLY TOLERATED? | 9% |
| 3. What is the ACTUAL MAINTAINED time horizon of an investment/portfolio? | 6 months |
| 4. Who is the actual preferred reference? | FAMILY |
| 5. What are the ACTUAL INVESTMENT OBJECTIVES for a portfolio/investment as determined by the review of the investor's actual investment behaviour? | Growth |

The "TRUE" investor profile may indicate:

A balanced investment stance with validation from close and trusted sources. Quick turn-around and volatility is acceptable, yet these need to be well managed, however may ultimately deter an initial investment decision.

Points A and B are continuously being tracked and compared so as to determine an actual behaviour-derived set of determinant parameters for the benefit of establishing point C. Point C is the result of a reconciliation and weighting attributed to the consistencies and inconsistencies existing between points A and B and the reaction of the investor upon being presented these existing weighted consistencies and inconsistencies. Point C, being the most current and "True" representation of the investor's current actual investment behaviour, may then serve as the benchmark "TRUE" investor profile. Up until the point a new and more "True" investor profile is warranted.

Consequently, a strong sense of customer loyalty can be built upon a service platform based on a broker's well-supported awareness and understanding of an investor's "TRUE" needs and wants.

The profiling platform offers the ability to connect to as many product/services/opportunity databases that the offering party (industry specific) chooses to make available to its clients. As such, the tool can search for and present opportunities to the investor as based on the investor's "TRUE" investor profile, and as the investor's "TRUE" investor profile is being for ever monitored to ensure its accurate and timely representation of the investor's "TRUE" investor behaviour. As such and furthermore, the tool offers the capability of validating the resulting "TRUE" investor profile with the logging of the investor's reaction to the presentation of those opportunities deemed to be best suited to the investor's "TRUE" profile (according to industry specific standards). Furthermore, validating and/or disproving the "TRUE" investor profile as it currently stands, and the process continues.

Practically, the system could further work as follows; the investor's "TRUE" investor profile points to the consumer liking INTERNET STOCKS, consequently the system brings forward "YAHOO".

Scenario 1: The investor buys "Yahoo". The investor's "TRUE" profile is being respected. As such, the system can further validate the currently governing "TRUE" investor profile.

Scenario 2: The investor DOES NOT buy "Yahoo". The investor's "TRUE" profile is not yet being fully and accurately respected, therefore the continued tracking of the investor's actual investment behaviour continues.

1. Establishing an initial go-forward governing consumption behaviour profile as per a consumer's self-perception. (this may involve the use of an industry specific questionnaire with specific modifications so as to establish a pertinent go-forward governing consumption profile)
2. Establishing of the consumer's actual profile according to consumer's actual consumption behaviour activity. (this may involve using; consumer's historical consumption behaviour data and/or tracking actual current and future consumer's activity consumption behaviour
3. Comparison and reconciliation of consumer's self-perceived consumption profile and his actual consumption derived profile.
4. Representation to consumer of existing consumption behaviour profile consistencies and inconsistencies
5. Recording of user's reaction to existing profile consistencies and inconsistencies
6. Establishing of new consumer governing profile (a consumer's "True" consumption profile)
   UPON having reconciled the consumer's self-perceived consumption profile and his actual-consumption behaviour derived profile, as well as all behaviour reactions stemming form the representation of this reconciliation, the establishment of the consumer's "TRUE" consumption behaviour profile is enabled (replacing the initial go-forward governing consumption behaviour profile as per the consumer's initial self-perception), which in turn is to be referenced as the governing profile benchmark to which all future consumption behaviour within that given industry is to be compared to; once again until the time a revised and more timely "True" consumer consumption profile benchmark is warranted and instituted, and once again, the process repeats itself.
   The consumer's governing consumption profile is continuously being monitored and up-dated so that it may represent the "True" consumption behaviour pattern of the said consumer 7. Supplier establishes a new customer servicing approach. (One that is based as per the customer's "True" consumption behaviour profile).

Although the present invention has been explained hereinabove by way of a preferred embodiment thereof, it should be pointed out that any modifications to this preferred embodiment within the scope of the appended claims is not deemed to alter or change the nature and scope of the present invention.

The invention claimed is:

1. A computerized system for creating a consumer's "true" consumption profile, comprising:
   computer implemented means for initially establishing a consumer's self-perceived consumption behaviour profile;
   computer implemented means for monitoring said consumer's behaviour to create an actual behaviour derived consumption profile;
   computer implemented means for comparing said consumer's self-perceived consumption behaviour profile with the consumer's actual behaviour derived consumption profile to identify consistencies and inconsistencies; and
   computer implemented means for creating a consumer's "true" consumption behaviour profile based on the consumer's self-perceived consumption behaviour profile, and the consumer's actual behaviour derived consumption profile and a consumer's reaction when presented with said consistencies and inconsistencies;
   computer implemented means for attributing a weighting to the consistencies and inconsistencies existing between the consumer's self-perceived consumption behavior profile with the consumer's actual behavior derived consumption profile; and
   computer implemented means for entering said consumer's reaction to said consistencies and inconsistencies wherein said means for comparing said initial consumer profile with the tracked behavior of said consumer further includes means for logging consistencies and inconsistencies between said initial consumer profile and the tracked behavior of said consumer in a reaction log.

2. A system according to claim 1, wherein said "true" consumption profile is created based on said reaction log.

3. A system according to claim 1, wherein the means for comparing are sporadically activated.

4. A system according to claim 1, wherein the means for comparing are activated at predetermined times.

5. A system according to claim 1, wherein the means for comparing are continuously activated.

6. A system according to claim 1, wherein said "true" consumption profile is continuously updated, and is used by said means for comparing after the establishment of the initial profile.

7. A system according to claim 1, wherein said means for establishing an initial consumer's self-perceived consumption profile includes a questionnaire to be answered by said consumer.

8. A system according to claim 7, wherein said questionnaire is an industry-specific questionnaire.

9. A system according to claim 1, wherein said means for monitoring said consumer's actual consumption pattern behaviour include means for tracking inquiries and purchases.

10. A system according to claim 9, wherein said means for tracking said consumer's behaviour further include means for monitoring simulations.

11. A system according to claim 1, wherein said "true" consumption profile is used to establish an accurate consumer servicing approach by a vendor-user of said system.

12. A system according to claim 1, wherein said initial consumer profile is created with pre-existing historical data.

13. A system according to claim 1, wherein said "true" consumption profile is modified or not depending on said consumer reaction.

14. A system according to claim 1, wherein said true consumer profile is used to suggest products or services to said consumer.

15. A system according to claim 1, wherein said weighting is an industry accepted weighting.

16. A system according to claim 1, wherein said initial consumer profile is created with the use of industry specific profiling tools.

* * * * *